(12) United States Patent
Nordmeyer

(10) Patent No.: US 7,420,462 B2
(45) Date of Patent: Sep. 2, 2008

(54) AIR SPRING DISTANCE INDICATING SYSTEM AND METHOD

(75) Inventor: Daniel L. Nordmeyer, Indianapolis, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 121 days.

(21) Appl. No.: 11/337,746

(22) Filed: Jan. 23, 2006

(65) Prior Publication Data

US 2007/0171036 A1 Jul. 26, 2007

(51) Int. Cl.
*B60Q 1/00* (2006.01)

(52) U.S. Cl. ............... 340/438; 340/686.1; 342/118

(58) Field of Classification Search ... 340/686.1–686.6, 340/679, 425.5, 440; 702/150, 158, 159; 342/118, 385
See application file for complete search history.

(56) References Cited

U.S. PATENT DOCUMENTS

| | | | |
|---|---|---|---|
| 3,780,370 | A | 12/1973 | Reeves |
| 3,859,624 | A | 1/1975 | Kriofsky et al. |
| 4,041,490 | A | 8/1977 | Watt et al. |
| 4,068,951 | A | 1/1978 | Froome et al. |
| 4,072,946 | A | 2/1978 | Kneefel |
| 4,183,022 | A | 1/1980 | Baudard et al. |
| 4,307,397 | A | 12/1981 | Holscher |
| 4,621,705 | A | 11/1986 | Etoh |
| 4,646,092 | A | 2/1987 | Schreuder |
| 4,737,705 | A | 4/1988 | Bitar et al. |
| 4,739,328 | A | 4/1988 | Koelle et al. |
| 4,757,315 | A | 7/1988 | Lichtenberg et al. |
| 4,798,369 | A * | 1/1989 | Geno et al. ............ 267/64.11 |
| 4,804,961 | A | 2/1989 | Hane |
| 4,812,842 | A * | 3/1989 | Bayerlein et al. ...... 340/825.72 |
| 4,817,922 | A | 4/1989 | Hovance |
| 5,229,829 | A | 7/1993 | Nihei et al. |
| 5,285,189 | A | 2/1994 | Nowicki et al. |
| 5,298,904 | A | 3/1994 | Olich |
| 5,337,137 | A | 8/1994 | Ogawa et al. |

(Continued)

FOREIGN PATENT DOCUMENTS

DE 197 01 530 C1 8/1998

(Continued)

OTHER PUBLICATIONS

Lee and Sorrells, "Passive RFID Basics," Microchip Technology Inc., 2001, pp. 1-8.

(Continued)

*Primary Examiner*—George A Bugg
*Assistant Examiner*—Hoi C Lau
(74) *Attorney, Agent, or Firm*—Sarah M. Jabbari; Fay Sharpe LLP

(57) ABSTRACT

A distance indicating system includes a transmitting portion, a transceiver spaced a distance from the transmitting portion, and a receiving portion supported in spaced relation to the transceiver. The transmitting portion broadcasting a first electromagnetic wave. The transceiver receiving the first electromagnetic wave and transmitting a second electromagnetic wave to the receiving portion. The transceiver is operative to modulate the second electromagnetic wave in relation to an input to communicate a signal, data or information, such as the distance between the transmitting portion and the transceiver, an acceleration input, a pressure level or a temperature reading.

26 Claims, 5 Drawing Sheets

U.S. PATENT DOCUMENTS

| | | | |
|---|---|---|---|
| 5,373,445 A * | 12/1994 | Yopp | 701/37 |
| 5,500,065 A | 3/1996 | Koch et al. | |
| 5,521,497 A | 5/1996 | Schneider et al. | |
| 5,548,291 A | 8/1996 | Meier et al. | |
| 5,550,536 A | 8/1996 | Flaxl | |
| 5,552,789 A | 9/1996 | Schuermann | |
| 5,559,507 A | 9/1996 | Beigel | |
| 5,570,086 A | 10/1996 | Hanaoka et al. | |
| 5,589,821 A | 12/1996 | Sallen et al. | |
| 5,594,448 A | 1/1997 | d'Hont | |
| 5,619,207 A | 4/1997 | d'Hont | |
| 5,701,121 A | 12/1997 | Murdoch | |
| 5,707,045 A | 1/1998 | Easter | |
| 5,731,754 A | 3/1998 | Lee, Jr. et al. | |
| 5,801,372 A | 9/1998 | Yamaguchi | |
| 5,859,692 A | 1/1999 | Ross, Jr. et al. | |
| 5,936,161 A * | 8/1999 | Fischer | 73/632 |
| 6,036,179 A | 3/2000 | Rensel | |
| 6,073,491 A * | 6/2000 | Fischer et al. | 73/629 |
| 6,122,329 A | 9/2000 | Zai et al. | |
| 6,249,673 B1 | 6/2001 | Tsui | |
| 6,309,494 B1 | 10/2001 | Koch et al. | |
| 6,356,738 B1 | 3/2002 | Schneider et al. | |
| 6,414,626 B1 | 7/2002 | Greef et al. | |
| 6,469,590 B1 | 10/2002 | Lewis et al. | |
| 6,473,028 B1 | 10/2002 | Luc | |
| 6,474,380 B1 | 11/2002 | Rensel et al. | |
| 6,614,239 B2 | 9/2003 | Borghi | |
| 6,621,278 B2 | 9/2003 | Ariav | |
| 6,637,269 B2 | 10/2003 | Reck et al. | |
| 6,731,199 B1 | 5/2004 | Ueda | |
| 6,765,393 B2 | 7/2004 | Pierenkemper et al. | |
| 6,931,930 B2 * | 8/2005 | Reck | 73/597 |
| 6,963,301 B2 | 11/2005 | Schantz et al. | |
| 7,119,736 B2 | 10/2006 | Heide et al. | |
| 2002/0088517 A1 | 7/2002 | Shimura | |
| 2002/0180172 A1 | 12/2002 | Gottschalk et al. | |
| 2003/0090365 A1 | 5/2003 | Bergerhoff | |
| 2003/0150920 A1 | 8/2003 | Parks | |
| 2004/0118197 A1 | 6/2004 | Buist et al. | |
| 2004/0130442 A1 | 7/2004 | Breed et al. | |
| 2004/0203470 A1 | 10/2004 | Berliner et al. | |
| 2004/0257220 A1 | 12/2004 | Fischer et al. | |
| 2005/0253697 A1 * | 11/2005 | Taguchi | 340/447 |
| 2007/0013544 A1 * | 1/2007 | Chiu | 340/825.69 |

FOREIGN PATENT DOCUMENTS

| | | |
|---|---|---|
| DE | 19701530 C1 * | 8/1998 |
| FR | 2 574 188 A1 | 6/1986 |
| JP | 07 181254 A | 7/1995 |
| WO | WO 2006/073717 A | 7/2006 |

OTHER PUBLICATIONS

International Search Report; PCT/US2007/001532; dated Jun. 12, 2007; mailed Jun. 19, 2007.

* cited by examiner

AIR SPRING DISTANCE INDICATING SYSTEM AND METHOD

BACKGROUND

The present novel concept broadly relates to the art of distance measurement and, more particularly, to a system and method for indicating the distance between associated structural members using electromagnetic wave modulation.

The subject system and method are amenable to broad use in a wide variety of applications and environments. One example of a suitable application is the use of the subject system and method on and with an associated fluid suspension member, such as an air spring of a vehicle, for example. The subject system and method will be discussed in detail hereinafter with specific reference to use on such an associated fluid suspension member. However, it is to be specifically understood that the subject system and method are capable of broader application and are not intended to be limited to the specific examples shown and discussed herein, which are merely examples of suitable applications.

A variety of well known and commonly used devices and arrangements have been and are currently used to monitor the relative position of one structural member to another. For example, mechanical linkage sensors that include one or more linkage members are often used to connect between adjacent structural members, such as a suspension component of a vehicle and the corresponding frame or body of the same. The linkage members typically act through a variable resistor or other suitable component that changes in response to the movement of the linkage. An electronic control unit (ECU) or other suitable device then determines the relative position of one structural member to the other based upon a corresponding change in voltage across the variable resistor or a corresponding change in current through the resistor.

Unfortunately, such arrangements have a number of problems and/or disadvantages that are commonly associated with their continued use. One problem with the use of mechanical linkages, particularly those used in association with the suspension system of a vehicle, is that the linkages are frequently subjected to physical impacts, such as may be caused by debris from a roadway, for example. This can result in the linkage being significantly damaged or broken, such that the device no longer operates properly, if it operates at all.

Another problem with mechanical linkage sensors is that the electronic components thereof are typically exposed to harsh environmental conditions (e.g., temperature extremes, water, dirt, salt) normally experienced by a vehicle traveling along a roadway. As a result of such exposure, the electronic components of the sensors can become corroded and fail to function properly. Due to one or both of these or other problems, one or more of the mechanical linkage sensors may be non-operational at any given time. Thus, regular inspection and replacement of such sensors is typically required.

Still another disadvantage of mechanical linkage sensors is that the same are mounted separately from the other suspension components. As a result, additional time and effort is typically spent installing these components during the assembly process. Furthermore, additional effort is typically involved in creating a clearance area for mounting and operation of the mechanical linkage. Thus, such sensors disadvantageously require a significant amount of effort and space for mounting and operation.

As an alternative to mechanical linkage sensors, non-contact sensors that utilize sound or pressure waves traveling through a fluid medium, typically at an ultrasonic frequency, have been used in determining the relative position of one structural member to another. One example of such an application includes an ultrasonic sensor being used to determine a height of a fluid suspension member, such as an air spring. In such a use, the ultrasonic sensor is supported on one end member of the air spring and sends ultrasonic waves through the spring chamber of the air spring toward the opposing end member. The waves are reflected back by a suitable feature of the opposing end member and the distance therebetween is determined in a conventional manner.

One advantage of such an arrangement over mechanical linkages is that the ultrasonic sensor is at least partially sheltered from impacts and exposure. However, numerous disadvantages also exist with the use of ultrasonic sensors. One such disadvantage is that such sensors are relatively expensive which tends to undesirably increase production costs. Also, the replacement cost of a sensor that does get damaged by an impact or from exposure is likewise increased.

Another disadvantage is that ultrasonic sensors require a target that is suitable to reflect the ultrasonic waves back to the sensor for determining the distance therebetween. If such a target is not provided, the ultrasonic waves will not be reflected back properly and, thus, a correct determination of distance will not be possible. Thus, a target area must be provided for the proper operation of ultrasonic sensors. This can be particularly problematic, however, where the design constraints of a product limit the possibilities for including a target area. This is also a problem for existing products are being outfitted with ultrasonic sensors, where the existing products do not have a suitable target area.

BRIEF DESCRIPTION

A distance indicating system in accordance with one embodiment of the present novel concept is provided that includes a transmitter for broadcasting a first electromagnetic wave. A transceiver is supported at a distance from the transmitter. The transceiver is operative to receive the first electromagnetic wave and to transmit a second electromagnetic wave. The transceiver is also operative to modulate the second electromagnetic wave in relation to the distance. A receiver is supported in spaced relation to the transceiver and is operative to receive the modulated second electromagnetic wave.

A distance indicating system in accordance with another embodiment of the present novel concept for an associated vehicle suspension system that includes an associated air spring assembly with first and second end members and an elastomeric wall disposed therebetween is provided that includes a transmitter supported adjacent the first end member for broadcasting a first electromagnetic wave. A transceiver is supported adjacent the second end member at a distance from the transmitter. The transceiver is operative to receive the first electromagnetic wave and to transmit a second electromagnetic wave. The transceiver is also operative to modulate the second electromagnetic wave in relation to the distance. A receiver is supported in spaced relation to the transceiver and is operative to receive the modulated second electromagnetic wave.

An air spring assembly in accordance with one embodiment of the present novel concept is provided that includes a first end member, a second end member spaced from the first end member and a flexible spring wall supported between the first and second end members and at least partially forming a fluid chamber therebetween. A first transceiver is supported on the first end member and includes a first antenna for transmitting a first electromagnetic wave and a second antenna for receiving a second electromagnetic wave. A second transceiver is supported on the second end member at a distance from the first transceiver. The second transceiver includes a first antenna operative to receive the first electromagnetic wave, a second antenna operative to transmit the second electromagnetic wave, and a processing device in electrical communication between the first and second antennae. The processing device receives an electrical signal having a relation to the distance from the first antenna of the second transceiver. The processing device also modulates a characteristic of the second electromagnetic wave in relation to the electrical signal.

A method of determining a distance between first and second end members of an air spring in accordance with one embodiment of the present novel concept is provided that includes providing a transmitter supported adjacent the first end member and broadcasting a first electromagnetic wave. The method also includes providing a transceiver supported in spaced relation to the transmitter adjacent the second end member and transmitting a second electromagnetic wave. The method further includes inducing an electrical signal in the transceiver using the first electromagnetic wave, and modulating the second electromagnetic wave in relation to a distance between the transmitter and the transceiver. The method also includes determining the distance between the transmitter and the transceiver based on the modulated second electromagnetic wave.

DETAILED DESCRIPTION

Figure 1:
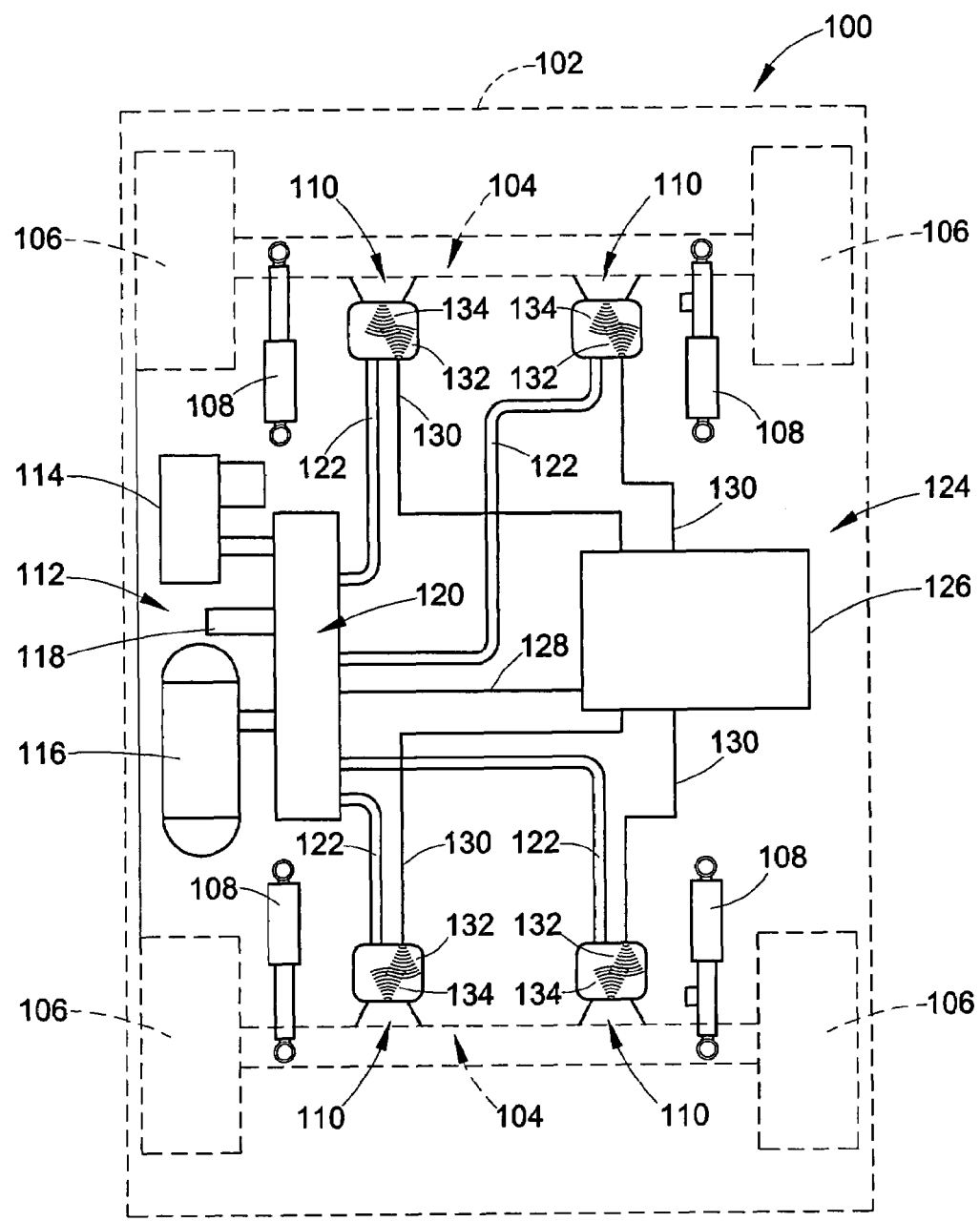
FIG. 1 is a representation of a distance indicating system in accordance with the present novel concept shown in operative association with a vehicle.

Turning now to the drawings wherein the showings are for the purpose of illustrating exemplary embodiments of the present novel concept and not for limiting the same, FIG. 1 illustrates a vehicle 100 having a sprung mass, such as a vehicle body 102, for example, and an unsprung mass, such as axles 104 and wheels 106, for example. A plurality of damping members, such as shock absorbers 108, for example, are secured between the sprung and unsprung masses of the vehicle in a suitable manner. Additionally, a plurality of fluid spring members, such as air spring assemblies 110, for example, are disposed between the sprung and unsprung masses of the vehicle adjacent wheels 106 and shock absorbers 108.

Vehicle 100 also includes a fluid supply system 112 that is in communication with air spring assemblies 110 and is operative to selectively supply and exhaust pressurized fluid therefrom. Fluid supply system 112 includes a pressurized fluid source, such as a compressor 114, and can optionally include a storage vessel, such as reservoir 116, for example, for receiving and storing pressurized fluid from the pressurized fluid source. System 112 can further include a suitable fluid exhaust, such as a muffler 118, for example, for venting pressurized fluid from the system.

Fluid supply system 112 can be in communication with the fluid spring members in any suitable manner. For example, system 112 can include a valve assembly 120 or other suitable device or arrangement for selectively distributing pressurized fluid between the pressurized fluid source or sources and the fluid spring members. As shown in the exemplary embodiment in FIG. 1, compressor 114, reservoir 116 and muffler 118 are in fluid communication with valve assembly 120. Additionally, air spring assemblies 110 are in fluid communication with valve assembly 120 via fluid lines 122. Thus, valve assembly 120 can be selectively actuated to transfer pressurized fluid from the compressor and/or reservoir to one or more of the air spring assemblies. Additionally, valve assembly 120 can be selectively actuated to exhaust pressurized fluid from one or more of the air spring assemblies by way of muffler 118 or another suitable arrangement. It will be appreciated that the foregoing fluid supply system and operation thereof are merely exemplary and that any other suitable fluid source, system and/or method of operation can alternately be used.

Vehicle 100 also includes a suspension control system 124 for selectively operating one or more suspension system components, such as shock absorbers 108, air spring assemblies 110 and/or pressurized fluid supply system 112, for example. Suspension control system 124 includes an electronic control unit 126 in communication with one or more components of valve assembly 120, such as through a communication line 128, for example, for selective actuation and/or operation thereof. Additionally, electronic control unit 126 is in communication with air spring assemblies 110 in a suitable manner, such as through communication lines 130, for example.

Suspension control systems, such as control system 124, for example, are operable in a wide variety of manners. For example, suspension control systems, such as control system 124, for example, can be used for height adjustment (i.e., to selectively raise or lower the sprung mass of a vehicle). As another example, suspension control systems, such as control system 124, for example, can be used for leveling operations (i.e., to maintain the sprung mass of a vehicle in a substantially level orientation). Given this common association with height monitoring and adjustment, suspension control systems typically utilize one or more height or distance sensors to monitor the vehicle height and/or orientation. A wide variety of height sensors and/or distance determining devices are known and commonly used, as discussed in one of the foregoing sections hereof. As an alternative arrangement, air spring assemblies 110 include distance indicating systems in accordance with the present novel concept that transmit electromagnetic waves 132 and 134 to determine and communicate a height of the vehicle or distance between two vehicle or suspension system components.

Figure 2:
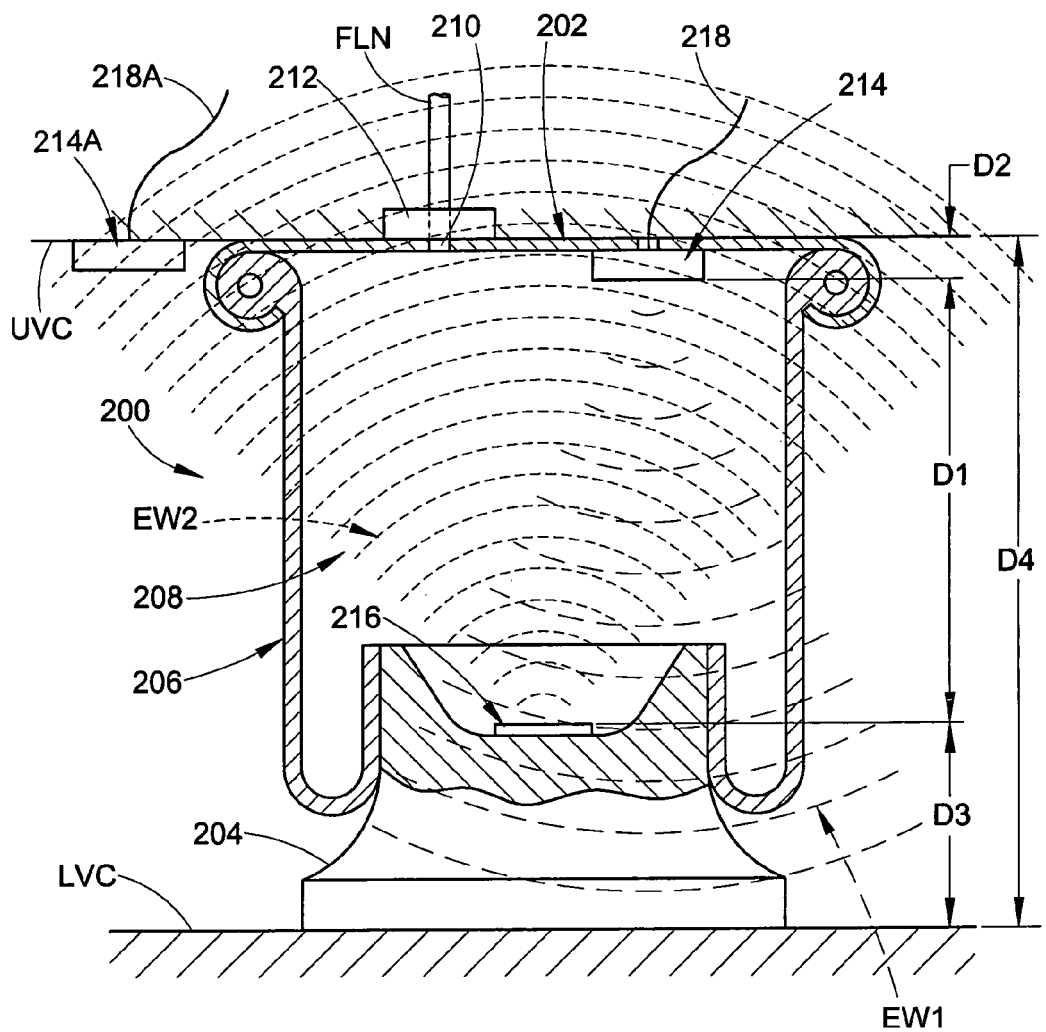
FIG. 2 is a side view, in partial cross section, of one exemplary embodiment of an air spring assembly including a distance indicating system in accordance with the present novel concept.

One exemplary embodiment of a fluid suspension member in accordance with the present novel concept is shown in FIG. 2 as air spring assembly 200 that includes a first or upper end member 202, a second or lower end member 204 and a flexible spring wall 206 secured therebetween. First or upper end member 202 is shown disposed along an associated upper vehicle component UVC and second or lower end member 204 is shown disposed along an associated lower vehicle component LVC. The upper and lower vehicle components could, for example, be parts of or associated with the respective sprung and unsprung masses of the vehicle. Additionally, it will be appreciated that the first and second end members can be respectively secured on the upper and lower vehicle components in any suitable manner, such as by using fasteners (not shown), for example. Furthermore, it will be appreciated that air spring assembly 200 is shown in FIG. 2 of a rolling-lobe construction. It is to be understood, however, that this construction is merely exemplary and that any other suitable construction can alternately be used.

Flexible spring wall 206 at least partially defines a spring chamber 208 extending between end members 202 and 204. A suitable fluid line FLN, such as one of fluid lines 122 in FIG. 1, for example, is in communication with spring chamber 208 through an opening formed through one of the end members of the air spring assembly, such as passage 210 formed through first end member 202, for example. A suitable connector or fitting 212 can be used to maintain fluid line FLN in operative association with spring chamber 208 through passage 210.

Air spring assembly 200 also includes a distance indicating system (not numbered) that includes a first transceiver 214 and a second transceiver 216 spaced a distance D1 from the first transceiver. First transceiver 214 can be in communication with one or more devices or components through a conductive lead 218. For example, conductive lead 218 can be representative of communication line 130 in FIG. 1 extending between an air spring assembly 110 and electronic control unit 126. Additionally, electrical power can be supplied from an external power source (not shown), such as a battery or vehicle alternator, for example. As shown in FIG. 2, however, second transceiver 216 is preferably wireless. Thus, communication to and from second transceiver 216 occurs using a first electromagnetic wave EW1 and a second electromagnetic wave EW2.

In the exemplary embodiment shown in FIG. 2, first transceiver 214 is supported on first end member 202 and second transceiver 216 is supported on second end member 204. The first and second transceivers can be secured on the end members in any suitable manner, such as by using suitable fasteners, adhesives, bracketry or by manufacturing (e.g., molding) a transceiver or component thereof into or onto the end member. Additionally, it is to be understood that such an arrangement is merely exemplary and that any components of a distance indicating system in accordance with the present novel concept can be mounting in other positions, orientations and/or arrangements.

It will be recognized from FIG. 2 that the first and second transceivers can be used in a non-aligned orientation. That is, in the exemplary embodiment shown in FIG. 2, second transceiver 216 is disposed approximately centrally on the second end member whereas first transceiver 214 is disposed outwardly toward a peripheral edge of the first end member. As such, first transceiver 214 could optionally include a second portion 214A that is separately mountable from the first portion and in communication with one or more other devices or components through a conductive lead 218A. In such an arrangement, the first portion could be a transmitting portion and the second portion could be a receiving portion. However, any other suitable configuration, arrangement or method of operation could alternately be used.

Furthermore, it will be appreciated that distance D2 between first transceiver 214 and first end member 202 and distance D3 between second transceiver 216 and second end member 204 will normally be fixed distances. As such, one of skill in the art will recognize that the distance between the transceivers, which is represented by dimension D1 in FIG. 2, can also be representative of the height of air spring assembly 200, as indicated by dimension D4, and that other dimensions or distances could be similarly determined.

Figure 3:
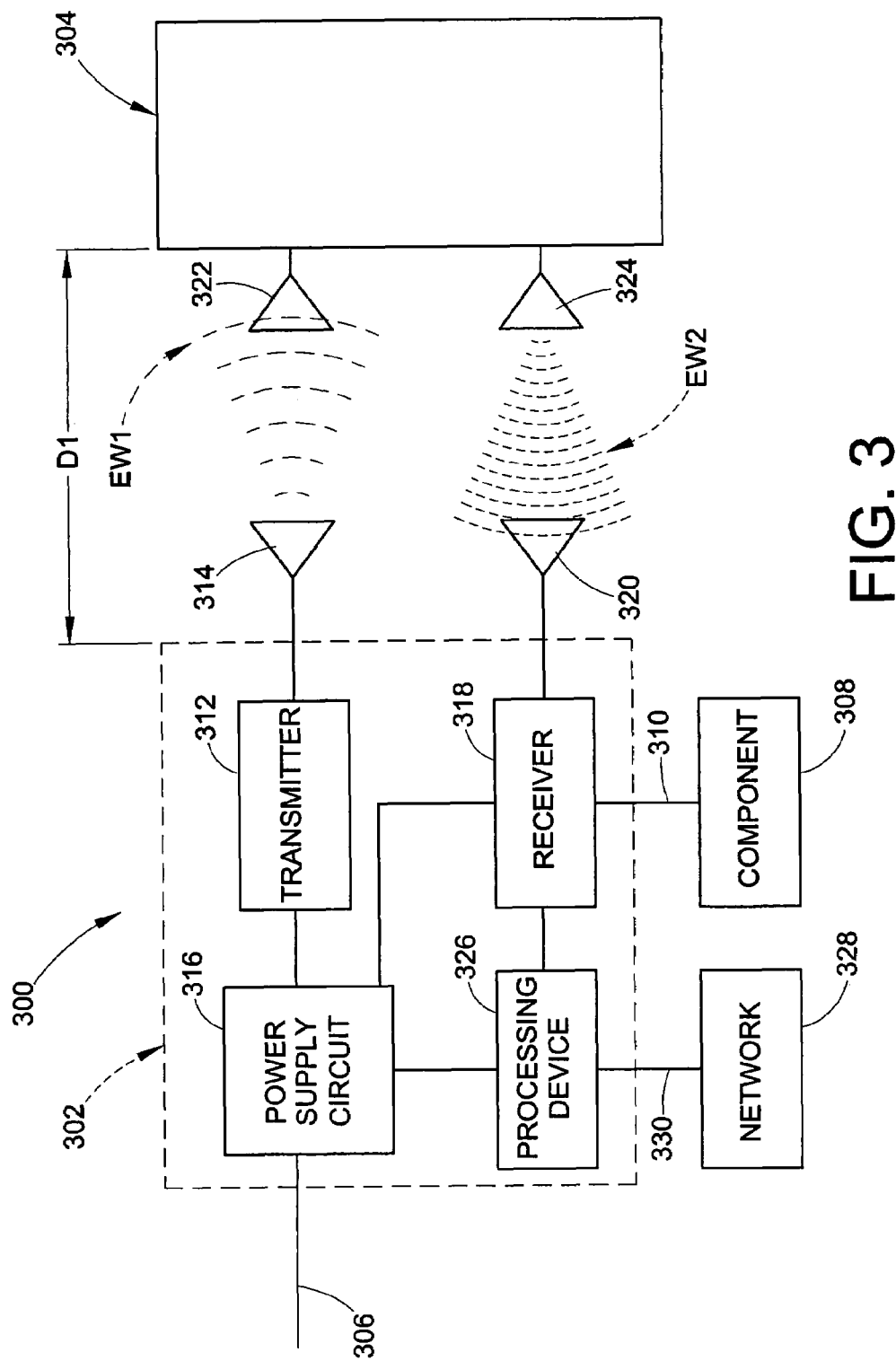
FIG. 3 is a schematic representation of one exemplary embodiment of a distance indicating system in accordance with the present novel concept.

One exemplary embodiment of a distance indicating system 300 is schematically illustrated in FIG. 3 and includes a first transceiver 302 and a second transceiver 304 spaced a distance D1 from first transceiver 302. First transceiver 302 is in communication with a suitable external power source, such as a battery or an alternator of a vehicle, for example, through a conductive lead 306. Additionally, first transceiver 302 can be in communication with one or more other systems and/or components 308, such as through a suitable conductive lead 310, for example.

First transceiver 302 includes a transmitter 312 and a first antenna 314 in communication with the transmitter. Suitably conditioned electrical power can be provided to transmitter 312 from an external power source (not shown) through lead 306. Alternately, first transceiver 302 can include a power supply circuit 316 in communication with conductive lead 306 for receiving electrical energy from a suitable electrical power source. Circuit 316 can output conditioned electrical power of appropriate voltages and/or current levels for use and operation of other components of transceiver 302. For example, power supply circuit 316 is shown in FIG. 3 in electrical communication with transmitter 312 and provides conditioned electrical power thereto.

Transmitter 312 is operative to output a carrier wave signal that is broadcast as a first electromagnetic wave EW1 using first antenna 314. Transceiver 302 also includes a receiver 318 in electrical communication with power supply circuit 316 and a second antenna 320 in electrical communication with receiver 318. Second transceiver 304 includes a first antenna 322 operative to receive first electromagnetic wave EW1. The second transceiver also includes a second antenna 324 operative to transmit a second electromagnetic wave EW2, which is received at second antenna 320 of first transceiver 302 and communicated to receiver 318 thereof. Second transceiver 304 can generate a modulation signal corresponding to an input acting on an associated component of the distance indicating system, such as a structural component upon which the second transceiver is supported, for example, and utilize the modulation signal to modulate a characteristic, such as frequency or amplitude, for example, of second electromagnetic wave EW2. The receiver is operative to recover a modulating signal from the second electromagnetic wave and generate an output signal related thereto to other devices and/or systems in a suitable manner, such as to component or device 308 through conductive lead 310, for example.

Optionally, first transceiver 302 can include a processing device 326 in communication with power supply circuit 316 that receives conditioned electrical power therefrom. Additionally, processing device 326 is in electrical communication with receiver 318 and can receive the output signal generated thereby. The processing device can then decode or translate the output signal into data and/or other information, such as data related to a distance, acceleration value, temperature level, pressure level or other input, for example. The data and/or other information can be communicated to other devices or systems, such as a system or vehicle network 328 through a conductive lead 330, for example.

In operation, first electromagnetic wave EW1 is transmitted from first transceiver 302 using first antenna 314 and is received by first antenna 322 of second transceiver 304. In one exemplary embodiment, first antenna 322 of second transceiver 304 includes an inductive element (not shown) or other suitable feature or component, and first electromagnetic wave EW1 induces an electrical output across or along this inductive element to provide electrical power to second transceiver 304. Alternately, a separate electrical power source could be provided on second transceiver 304 to provide electrical power thereto, rather than utilizing inductive coupling with first transceiver 302.

Those of skill in the art will recognize that one or more properties of electromagnetic waves vary with the distance of travel of the electromagnetic wave, according to well-known relationships. Thus, by using a suitable calculation, device or comparison, the distance of travel of first electromagnetic wave EW1 (i.e., the distance D1 between the first and second transceivers) can be determined by the second transceiver and communicated to the first transceiver or another component. Alternately, a signal corresponding to the distance of travel of first electromagnetic wave EW1 and/or other data or information can be communicated from the second transceiver to a suitable device or component for receiving wave EW1 and determining the distance and/or other data or information therefrom, such suitable components can include receiver 318 and/or processing device 326 of the first transceiver, for example.

Figure 4:
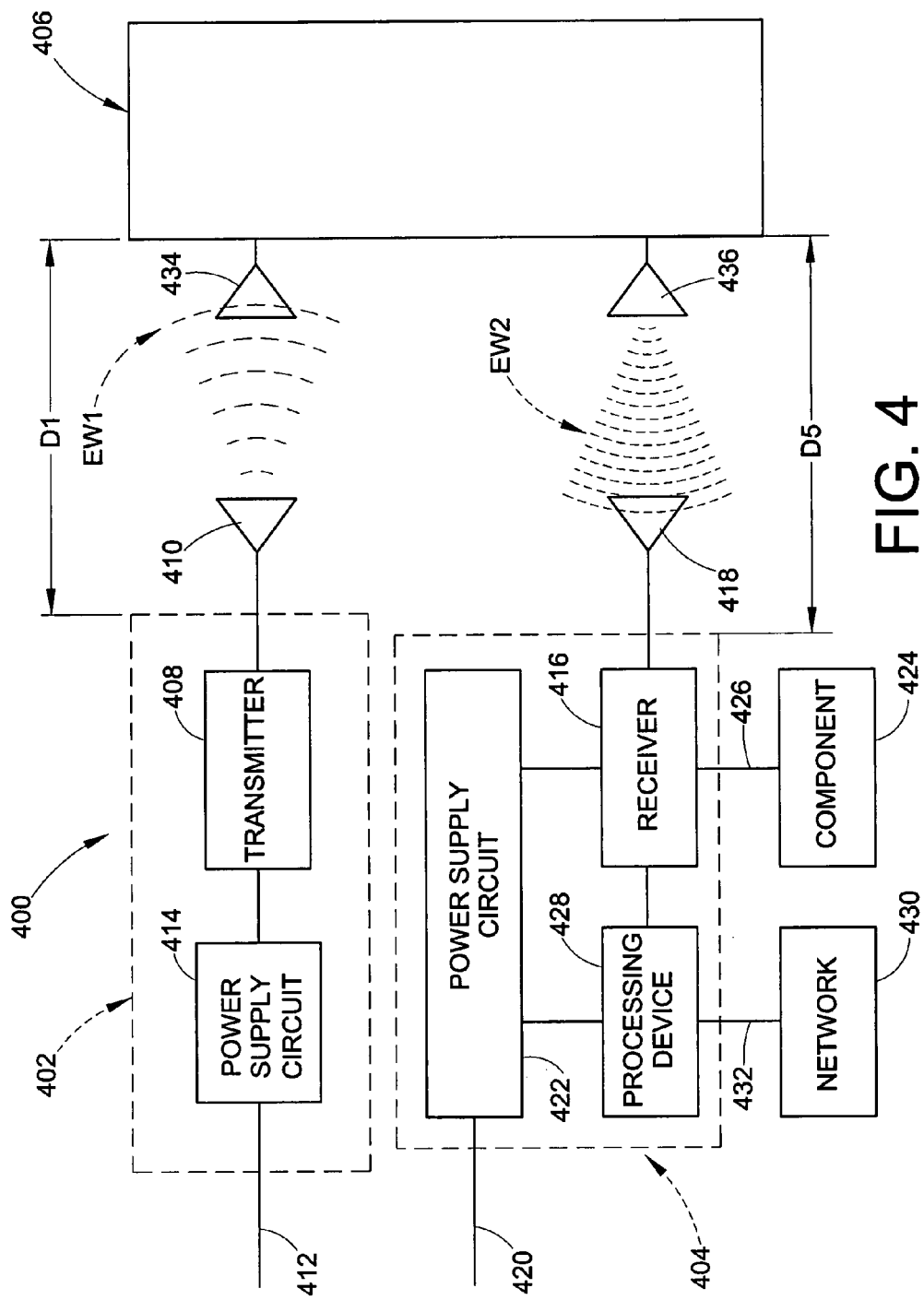
FIG. 4 is a schematic representation of another exemplary embodiment of a distance indicating system in accordance with the present novel concept.

Another exemplary embodiment of a distance indicating system 400 is shown in FIG. 4 and includes a transmitting portion 402, a receiving portion 404, and a transceiver 406. Transmitting portion 402 includes a transmitter 408 and an antenna 410 in communication with the transmitter, which is operative to generate a carrier wave signal that is broadcast as a first electromagnetic wave EW1 using antenna 410. Transmitter 408 can receive conditioned electrical power from an external power source through a suitable conductive lead, such as lead 412, for example. Alternately, transmitting portion 402 can include a power supply circuit 414 that can receive electrical power from an external power source and output conditioned electrical power to transmitter 408.

Receiving portion 404 includes a receiver 416 and an antenna 418 in electrical communication with receiver 416. Conditioned electrical power can be provided from an external electrical power source through a conductive lead, such as lead 420, for example. Alternately, a power supply circuit 422 can be included on receiving portion 404 that can receive electrical power from an external power source and output conditioned electrical power to the receiver. Receiver 416 is shown in FIG. 4 as being in electrical communication with a component or device 424 through a conductive lead 426, and is operative to output communication signals thereto. Optionally, a processing device 428 can be included on receiving portion 404 that is in electrical communication with power supply circuit 422 and receiver 416. Processing device 428, if provided, can be operative to output data, signals and/or other information to other components or systems, such as a vehicle or system network 430, for example, through a suitable connecting device, such as conductive lead 432, for example.

Transceiver 406 is shown in FIG. 4 as being spaced a distance D1 from transmitting portion 402. As such, first electromagnetic wave EW1 travels across distance D1 and is received along a first antenna 434 of transceiver 406. Transceiver 406 is operative to output a second electromagnetic wave EW2 from a second antenna 436 that is modulated to communicate signals, data and/or other information to receiving portion 404, in a manner similar to that discussed above with regard to distance indicating system 300. System 400 differs from distance indicating system 300, however, in that receiving portion 404 can be positioned and secured separately from transmitting portion 402. As such, receiving portion 404 is shown a being spaced a distance D5 from transceiver 406, which is shown as being of a greater magnitude than distance D1. It will be appreciated, however, that distance D5 is merely representative of a distance that can be different from distance D1, and that a greater or lesser distance than that of distance D1 can be represented thereby.

Figure 5:
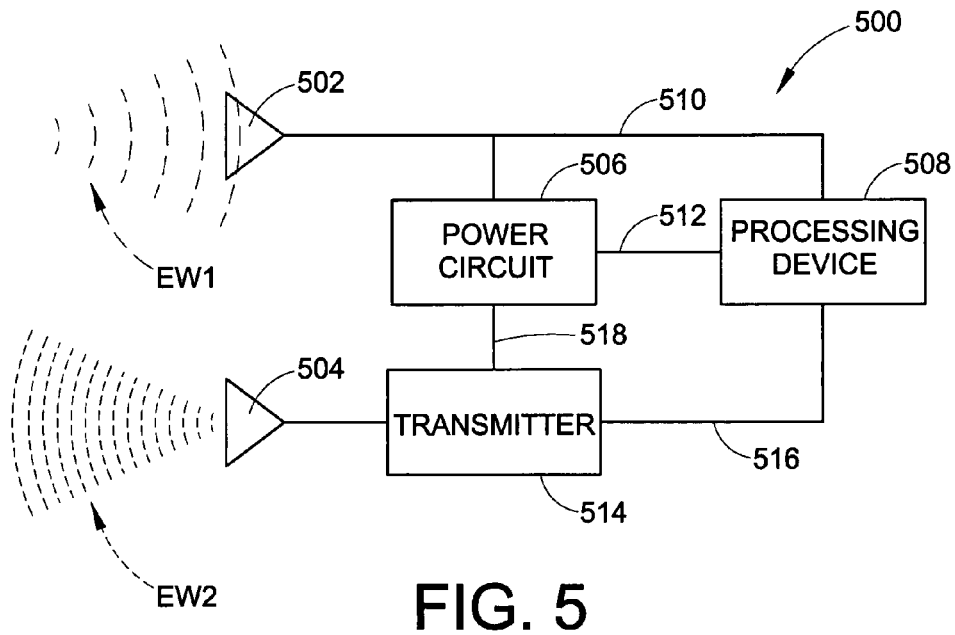
FIG. 5 is a schematic representation of one exemplary embodiment of a transceiver in accordance with the present novel concept.

One exemplary embodiment of a transceiver, such as transceivers 216, 304 and 406, for example, which are respectively shown in and discussed with regard to FIGS. 2-4, is shown in FIG. 5 as transceiver 500, which includes a first antenna 502 and a second antenna 504. First antenna 502 is operative to receive first electromagnetic wave EW1, and can include an inductive element (not shown) or other suitable device or component. First electromagnetic wave EW1 induces an electrical output across or along this inductive element to provide electrical power to the transceiver. Transceiver 500 also includes a power circuit 506 in electrical communication with first antenna 502. Power circuit 506 can operate to collect electrical energy induced on or along antenna 502 by first electromagnetic wave EW1. Alternately, a separate power source, such as a battery (not shown), for example, could be used.

A processing device 508 is in electrical communication with antenna 502 and power circuit 506 through electrical conductors 510 and 512, respectively. Power circuit 506 outputs electrical energy to the processing device that is suitably condition for the operation thereof. Additionally, an electrical signal output from antenna 502 is communicated to processing device 508 along electrical conductor 510, and the processing device is operative to output a modulation signal to a transmitter 514 along an electrical conductor 516. In one exemplary embodiment, the modulation signal output by the processing device has a relationship to the distance between the device or component that is broadcasting the first electromagnetic wave (e.g., transceiver 302 or transmitter portion 402) and transceiver 500. Power circuit 506 is also in communication with transmitter 514 through electrical conductor 518 and supplies electrical power thereto. Transmitter 514 is operative to generate a carrier wave signal and combine the carrier wave signal with the modulation signal from processing device 508 to transmit second electromagnetic wave EW2 using second antenna 504.

According to one exemplary embodiment, processing device 508 can be operative to translate or convert an electrical signal from antenna 502 into an amplitude and/or frequency varied modulation signal in which the variations in amplitude and/or frequency correspond to the voltage or current level of the electrical signal from the antenna. Again, it will be recognized that the voltage and/or current level of the electrical signal from the antenna will vary with the distance of travel of the first electromagnetic wave, which corresponds to the distance between the transceivers or other components. Thus, a distance measurement can be communicated as variations in frequency and/or amplitude of an electromagnetic wave. Therefore, electromagnetic wave EW2 is modulated in relation to the distance between the first and second transceivers. The modulated electromagnetic wave can be received by a receiving device or component, such as first transceiver 302 or receiver portion 404, for example, which can recover the modulation signal and output the same to a different component or system, which can determine the distance based thereon. Alternately, the receiving device or component can convert the modulation signal or otherwise determine the distance based on the modulation of the second electromagnetic wave EW2 and output data and/or information corresponding to the distance.

One example of a suitable component for use as processing device 508 is a voltage controlled oscillator or voltage-to-frequency converter that is operative to provide a variable frequency output in response to variations in input voltage.

One example of a suitable voltage-to-frequency converter is available from National Semiconductor Corp. of Santa Clara, Calif. under the product designation LM231AN.

Figure 6:
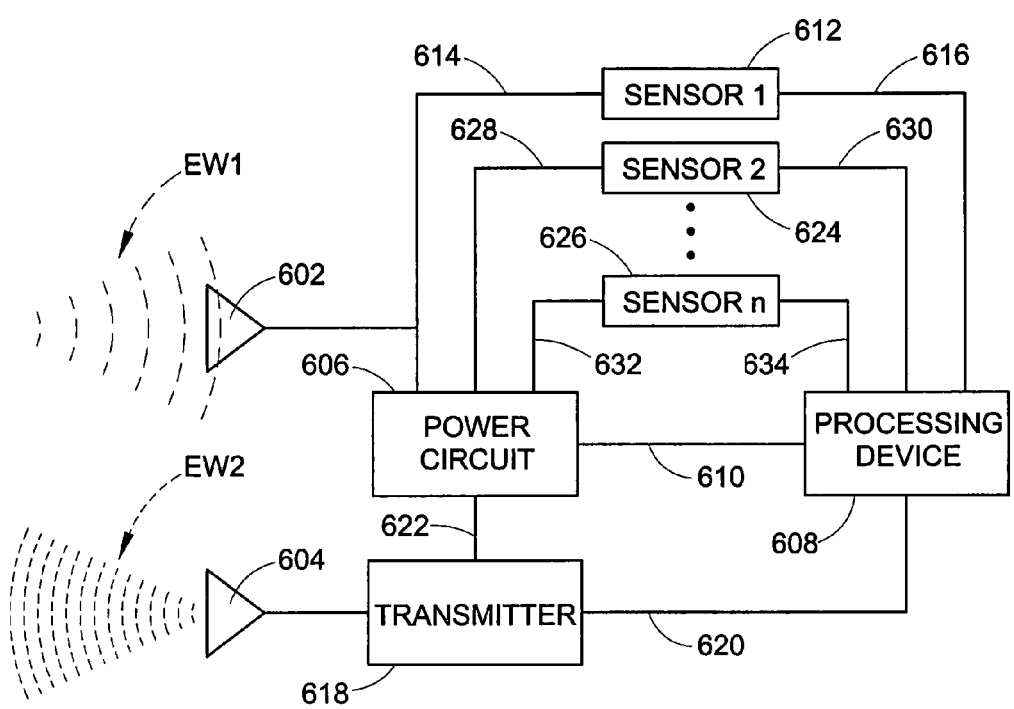
FIG. 6 is a schematic representation of another exemplary embodiment of a transceiver in accordance with the present novel concept.

Another exemplary embodiment of a transceiver, such as transceivers 216, 304, 406 and 500, for example, which are respectively shown in and discussed with regard to FIGS. 2-5, is shown in FIG. 6 as transceiver 600, which includes a first antenna 602 and a second antenna 604. Transceiver 600 also includes a power circuit 606 in electrical communication with antenna 602 and is operable to collect electrical energy induced on or along the first antenna as discussed above in detail. A processing device 608 is in electrical communication with power circuit 606 through an electrical conductor 610 and receives electrical energy therefrom that is suitably conditioned for operation of the processing device. A first sensor 612 is in electrical communication between antenna 602 and processing device 608 through electrical conductors 614 and 616. In one exemplary embodiment, sensor 612 is operative to output a signal related to the distance of travel of first electromagnetic wave EW1, as discussed above, and to communicate the sensor output signal to processing device 608.

Similar to processing device 508 in transceiver 500, first sensor 612 can be operative to vary the frequency and/or amplitude of the output signal thereof in response to variations in the voltage and/or current from antenna 602 along conductor 614. Alternately, an analog-to-digital converter or other suitable device can be used as sensor 612 to receive the input from along conductor 614 and transmit a digitized output signal to processing device 608 along conductor 616. As such, processing device 608 includes a device, such as a programmable microprocessor, microcontroller or microcomputer, for example, that is capable of receiving the digitized sensor input signal and generating a modulation signal corresponding to the distance of travel of the first electromagnetic wave.

The processing device, outputs the modulation signal to transmitter 618 through an electrical conductor 620. Transmitter 618 is in electrical communication with power circuit 606 through electrical conductor 622. The transmitter generates a second carrier wave signal and combines the same with the modulation signal to create modulated second electromagnetic wave EW2 that is transmitted by second antenna 604.

In one exemplary embodiment, transceiver 600 can also include one or more additional components, such as sensors 614 and 616. It will be appreciated that components of any suitable number, type and/or kind can be used, such as sensors operative to output sensor signals indicative of an input acting on another portion or component, such as an acceleration, a fluid pressure, or a component or fluid temperature, for example. As shown in FIG. 5, sensor 614 is in electrical communication between power circuit 606 and processing device 608 through conductive elements 628 and 630. Additionally, sensor 616 is in electrical communication between the power circuit and the processing device through conductive elements 632 and 634. Examples of suitable sensors include accelerometers, such as single and multi-axis accelerometers, for example; temperature sensors, such as thermocouples, for example; and pressure sensors, such as pressure transducers, for example.

If additional components, such as sensors 624 and/or 626, for example, are provided, processing device 608 will preferably be operative to receive output signals from these components as well as from sensor 612. The processing device can then communicate the signals or data and/or information corresponding thereto to the receiving device or component.

One example of suitable operation includes processing device 608 combining or encoding the various output signals and generating a modulation signal suitable for communicating the data and/or information from the sensors or other components. Optionally, signal encoding schemes can be used, such a frequency-shift keying, phase-shift keying, for example. Transmitter 612 then modulates the carrier wave using the modulation signal and the data and/or information is communicated to the first transceiver using second electromagnetic wave EW2, as discussed above. The first transceiver or receiving portion can thereafter recover and decode the modulation signal to output signals, data and/or information related to the output from the one or more sensors.

First electromagnetic wave EW1 and second electromagnetic wave EW2 are respectively based upon first and second unmodulated carrier wave signals. The unmodulated carrier wave signals can be generated in any suitable manner and in one exemplary embodiment are generated by a corresponding transmitter. For example, the first carrier wave signal can be generated by transmitter 312 or 408. Similarly, the second carrier wave signal can be generated by transmitter 514 or 618, for example. It will be appreciated that any suitable properties and/or characteristics can be used for the carrier wave signals. For example, the carrier wave signals can have any suitable frequency, such as from about 20 kHz to about 30 GHz. In one exemplary embodiment, first electromagnetic wave EW1 is based upon a first carrier wave signal having a frequency within a range of from about 30 kHz to about 300 MHz. Additionally, such an exemplary embodiment includes a second electromagnetic wave EW2 based upon a second carrier wave signal having a frequency within a range of from about 300 kHz to about 6 GHz. It is to be distinctly understood, however, that any suitable frequency or range of frequencies can alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. An air spring assembly comprising:
a first end member;
a second end member spaced from said first end member;
a flexible spring wall supported between said first and second end members and at least partially forming a fluid chamber therebetween;
a first transceiver supported on said first end member, said first transceiver including a first antenna operative to transmit a first electromagnetic wave and a second antenna operative to receive a second electromagnetic wave; and,
a second transceiver supported on said second end member at a distance from said first transceiver, said second transceiver including a first antenna operative to receive said first electromagnetic wave, a second antenna operative to transmit said second electromagnetic wave, a processing device in electrical communication between said first and second antennae, said processing device receiving an electrical signal having a relation to said distance from said first antenna of said second transceiver and modulating a characteristic of said second electromagnetic wave in relation to said electrical signal, and a sensor in electrical communication with said processing device, said sensor operative to output a sensor signal to said processing device indicative of an input acting on one of said second transceiver and said second end member.

2. An air spring assembly according to claim 1, wherein said modulated characteristic of said second electromagnetic wave is one of amplitude and frequency.

3. An air spring assembly according to claim 1, wherein said first transceiver includes a transmitting portion supported on said first end member and a receiving portion supported adjacent said first end member.

4. An air spring assembly according to claim 1, wherein said first transceiver includes a transmitter in electrical communication with said first antenna thereof and said transmitter operates at a frequency of from 30 kHz to about 300 MHz.

5. An air spring assembly according to claim 1, wherein said first transceiver includes a receiver in electrical communication with said second antenna thereof and operative to generate an output signal having a relation to said distance.

6. An air spring assembly according to claim 5, wherein said first transceiver includes a processing device in electrical communication with said receiver, said processing device receiving said output signal and determining said distance based on said output signal.

7. An air spring assembly according to claim 1, wherein said second transceiver includes a transmitter in electrical communication with said second antenna thereof and said transmitter operates at a frequency of from 300 kHz to 6 GHz.

8. An air spring assembly according to claim 7, wherein said second transceiver is inductively coupled to said first transceiver, and said second transceiver includes a power circuit in electrical communication with said first antenna thereof and operative to collect electrical energy due to said inductive coupling with said first transceiver.

9. An air spring assembly according to claim 1, wherein said sensor is one of an accelerometer, a thermocouple and a pressure transducer.

10. An air spring assembly according to claim 1, wherein said processing device is operative to modulate a characteristic of said second electromagnetic wave in relation to said distance and said sensor signal.

11. An air spring assembly according to claim 1, wherein said processing device includes one of a voltage-to-frequency converter, a microprocessor, a microcontroller or a microcomputer.

12. A method of determining a distance between first and second end members of an air spring, said method comprising:
  a) providing a transmitter supported adjacent the first end member and broadcasting a first electromagnetic wave;
  b) providing a transceiver supported in spaced relation to said transmitter adjacent said second end member and transmitting a second electromagnetic wave, wherein the transceiver includes a sensor outputting a sensor signal related to an input level;
  c) inducing an electrical signal in said transceiver using said first electromagnetic wave;
  d) modulating said second electromagnetic wave in relation to a distance between said transmitter and said transceiver and said sensor signal; and,
  e) determining said distance between said transmitter and said transceiver based on said modulated second electromagnetic wave.

13. A method according to claim 12, wherein d) includes modulating said second electromagnetic wave using a modulating signal based upon one of amplitude modulation and frequency modulation to generate said modulated second electromagnetic wave.

14. A method according to claim 13, wherein modulating said second electromagnetic wave includes generating said modulating signal based upon said induced electrical signal.

15. A method according to claim 14 further comprising providing a receiver in spaced relation to said transceiver, said receiver receiving said modulated second electromagnetic wave and recovering said modulating signal therefrom.

16. A method according to claim 12, wherein e) includes determining said distance and said input level based on said modulated second electromagnetic wave.

17. An air spring assembly comprising:
  a first end member;
  a second end member spaced from said first end member;
  a flexible spring wall supported between said first and second end members and at least partially forming a fluid chamber therebetween;
  a first transceiver supported on said first end member, said first transceiver including a first antenna operative to transmit a first electromagnetic wave and a second antenna operative to receive a second electromagnetic wave; and
  a second transceiver supported on said second end member at a distance from said first transceiver, said second transceiver including a first antenna operative to receive said first electromagnetic wave, a second antenna operative to transmit said second electromagnetic wave, a processing device in electrical communication between said first and second antennae of said second transceiver, said processing device receiving an electrical signal having a relation to said distance from said first antenna of said second transceiver and modulating a characteristic of said second electromagnetic wave in relation to said electrical signal, and an accelerometer in electrical communication with said processing device, said accelerometer operative to output a signal to said processing device indicative of an input acting on one of said second transceiver and said second end member.

18. The air spring assembly according to claim 17, wherein said modulated characteristic of said second electromagnetic wave is one of amplitude and frequency.

19. An air spring assembly according to claim 17, wherein said first transceiver includes a transmitting portion supported on said first end member and a receiving portion supported adjacent said first end member.

20. An air spring assembly according to claim 17, wherein said first transceiver includes a transmitter in electrical communication with said first antenna thereof and said transmitter operates at a frequency of from 30 kHz to 300 MHz.

21. An air spring assembly according to claim 17, wherein said first transceiver includes a receiver in electrical communication with said second antenna thereof and operative to generate an output signal having a relation to said distance.

22. An air spring assembly according to claim 21, wherein said first transceiver includes a processing device in electrical communication with said receiver, said processing device receiving said output signal and determining said distance based on said output signal.

23. An air spring assembly according to claim 17, wherein said second transceiver includes a transmitter in electrical communication with said second antenna thereof and said transmitter operates at a frequency of from 300 kHz to 6 GHz.

24. An air spring assembly according to claim 23, wherein said second transceiver is inductively coupled to said first transceiver, and said second transceiver includes a power circuit in electrical communication with said first antenna thereof and operative to collect electrical energy due to said inductive coupling with said first transceiver.

25. An air spring assembly according to claim 17, wherein said processing device is operative to modulate a characteristic of said electromagnetic wave in relation to said distance and said accelerometer signal.

26. An air spring assembly according to claim 17, wherein said processing device includes one of a voltage-to-frequency converter, a microprocessor, a microcontroller or a microcomputer.

\* \* \* \* \*